(12) United States Patent
Casset et al.

(10) Patent No.: US 10,670,942 B2
(45) Date of Patent: Jun. 2, 2020

(54) OPTICAL DEVICE

(71) Applicant: COMMISSARIAT A L'ENERGIE ATOMIQUE ET AUX ENERGIES ALTERNATIVES, Paris (FR)

(72) Inventors: Fabrice Casset, Tencin (FR); Thierry Hilt, La Terrasse (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 16/244,257

(22) Filed: Jan. 10, 2019

(65) Prior Publication Data

US 2019/0219887 A1    Jul. 18, 2019

(30) Foreign Application Priority Data

Jan. 18, 2018  (FR) ...................................... 18 50411

(51) Int. Cl.
   *G02F 1/295*    (2006.01)
   *G02F 1/01*     (2006.01)
   *G01S 7/481*    (2006.01)

(52) U.S. Cl.
   CPC ............ *G02F 1/295* (2013.01); *G02F 1/0134* (2013.01); *G01S 7/4818* (2013.01)

(58) Field of Classification Search
   CPC ................................ G02F 1/295; G01S 7/4818
   See application file for complete search history.

(56) References Cited

U.S. PATENT DOCUMENTS

| | | | |
|---|---|---|---|
| 4,454,418 A | 6/1984 | Walker | |
| 4,781,424 A * | 11/1988 | Kawachi | ................. G02B 6/126 385/1 |
| 5,383,048 A | 1/1995 | Seaver | |
| 6,947,639 B2 * | 9/2005 | Singh | ................. G02B 6/12007 385/37 |
| 9,221,074 B2 * | 12/2015 | Heideman | .............. G02B 6/305 |

(Continued)

OTHER PUBLICATIONS

U.S. Appl. No. 14/978,965, filed Dec. 22, 2015, 2016/0195893 A1, Thierry Hilt.

(Continued)

*Primary Examiner* — Ryan A Lepisto
(74) *Attorney, Agent, or Firm* — Oblon, McClelland, Maier & Neustadt, L.L.P.

(57) ABSTRACT

The invention relates to an optical device (100) comprising:
 a waveguide (200) comprising a core (210) extending along an axis of symmetry XX', and encapsulated in a cladding layer (220),
 an actuator (400) with width $L_a$, overlapping the core (210) and extending along an axis of symmetry YY' parallel to the axis of symmetry XX', said actuator (400) is designed so that when a voltage is applied to it, it imposes a mechanical stress at the core (210) to modify its refraction index
 the device being characterised in that the second axis of symmetry YY' is offset by a lateral offset D from a plane of symmetry of the waveguide (200) including the first axis of symmetry and perpendicular to the cladding layer (220), the lateral offset is between 15% and 50% of the width $L_a$.

21 Claims, 4 Drawing Sheets

(56) References Cited

U.S. PATENT DOCUMENTS

2004/0096155 A1    5/2004    Singh et al.

OTHER PUBLICATIONS

U.S. Appl. No. 15/046,803, filed Feb. 18, 2016, 2016/0244715 A1, Fabrice Casset, et al.
U.S. Appl. No. 15/335,702, filed Oct. 27, 2016, 2017/0121661 A1. Fabrice Casset, et al.
U.S. Appl. No. 15/501,686, filed Feb. 3, 2017, 2017/0222340 A1, Francois De Crecy, et al.
French Preliminary Search Report dated Sep. 6, 2018 in French Application 18 504 11 filed on Jan. 18, 2018 (with English Translation of Categories of Cited Documents).
Hosseini, N., et al. "Stress-optic modulator in TriPleX platform using a piezoelectric lead zirconate titanate (PZT) thin film", Optics Express 14018, vol. 23, No. 11, 2015, 9 pages.
Ghosh, S., et al. "Laterally vibrating resonator based elasto-optic modulation in aluminum nitride", APL Photonics, vol. 1, No. 3, 1. 036101, 2016, 7 pages.
Van Acoleyen, K., et al. "Two-Dimensional Dispersive Off-Chip Beam Scanner Fabricated on Silicon-On-Insulator", IEEE Photonics Technology Letters, vol. 23, No. 17, 2011, 3 pages.
Abiri, B., et al. "Electronic Two-Dimensional Beam Steering for Integrated Optical Phased Arrays", M2K.7. Optical Society of America, 2014, 3 pages.

\* cited by examiner

OPTICAL DEVICE

TECHNICAL DOMAIN

This invention relates to an optical device with a waveguide and an actuator designed to modify its refraction index. In particular, this invention relates to a layout of the actuator to apply a higher stress on the waveguide than that applied with layouts known in prior art.

PRIOR ART

The current expansion of optical technologies leaves no doubt. These technologies can satisfy demand from increasingly high performance optical devices, particularly Imagers or LIDAR ("Light Detection And Ranging") system.

Such devices are usually provided with waveguides that guide light radiation towards a target.

In particular, light radiation has to scan the surfaces of targets so as to detect them and/or reconstitute an image.

For example, a LIDAR device can be used, for example on board a self-contained vehicle, to image a scene (in other words a zone) covering about 38×10 m$^2$.

In this respect, these devices also comprise means of deflecting light radiation to induce a scan angle to said light radiation. Detection of the reflected signal then makes it possible to detect the presence of such obstacles.

FIG. 1 is a diagram representing the operation of a LIDAR 1 for detection of an object 2.

In particular, the LIDAR 1 comprises a light radiation source 3, particularly a LASER, an opto-mechanical assembly 4 that will induce a scan angle to light radiation, and a detector 5 that will collect light radiation reflected by the object 2.

In practice, the waveguides of optical devices are formed using technologies originating from micro-fabrication techniques, particularly making use of silicon technologies. In particular, the waveguides may include silicon nitride.

In such a case, deflection of light radiation can make use of different technical solutions.

Thus, document [1] cited at the end of the description discloses the use of a thermo-optic effect through a heating resistance integrated close to the waveguide, to deflect light radiation guided by such a waveguide.

Heating of a waveguide by the heating resistance induces a variation in the refraction index of the waveguide, and thus generates a phase shift of the light radiation guided by said waveguide.

However, this technical solution is not satisfactory when it induces a large energy consumption.

Alternatively, PIN diodes (described in document [2] mentioned at the end of this description), intended to inject free carriers into the waveguide(s) so as to modify its refraction index, have also been considered.

However, the cost associated with the fabrication of PIN diodes is too high for this alternative to be compatible with the requirements of the photonics industry.

Also alternatively and as shown in FIG. 2, a mirror 11 can be used to deflect the light radiation emitted by a laser 12.

However, integration of such a mirror is technologically difficult and is also associated with a cost that is incompatible with the requirements of the photonics industry.

Consequently, this alternative also is not satisfactory.

Finally, a last technical solution shown in FIG. 3 and described in documents [3] and [4] mentioned at the end of the description, was also envisaged.

This last solution is based on application of a stress in the waveguide through a piezoelectric actuator, so as to modify its refraction index.

Although this technical solution is interesting, it can only achieve relatively low stresses in the waveguide.

One purpose of this invention is then to disclose an optical device provided with a waveguide and an actuator to apply higher stresses in the waveguide and consequently larger variations of the refraction index.

PRESENTATION OF THE INVENTION

The purpose of this invention is at least partly achieved by an optical device comprising:
- a waveguide comprising a core extending along a first axis of symmetry XX', and encapsulated in a cladding layer provided with two essentially parallel principal faces, called the front face and the back face respectively,
- an actuator with width $L_a$, located on the front face and at least partly overlapping the core and extending along a second axis of symmetry YY' essentially parallel to the first axis of symmetry XX', is designed so that when an electric field is applied to it, it imposes a mechanical stress at the core to modify its refraction index
- the second axis of symmetry YY' is offset laterally by an offset called the lateral offset from a plane of symmetry of the waveguide including the first axis of symmetry and perpendicular to the principal faces of the cladding layer, and such that the lateral offset is between 15% and 50% of the width $L_a$.

According to one embodiment, the ratio between the width $L_a$ and the core width is between 8 and 100, advantageously between 15 and 100, and even more advantageously between 30 and 100.

According to one embodiment, the width $L_a$ is between 5 μm and 60 μm, advantageously between 10 μm and 60 μm, and even more advantageously between 20 μm and 60 μm.

According to one embodiment, the actuator comprises a first material placed between two electrodes that will apply the electric field to said actuator, the first material including a piezoelectric material or a ferroelectric material or an electrostrictive material.

According to one embodiment, the first material includes at least some elements chosen from among: Lead zirconate titanate, aluminium nitride, zinc oxide, polyvinylidene fluoride, lithium niobate (LNO for $LiNbO_3$), $BaTiO_3$, $PbTiO_3$.

According to one embodiment, the thickness of the waveguide is between 1 μm and 3 μm.

According to one embodiment, the cladding layer comprises silicon dioxide.

According to one embodiment, the core comprises silicon nitride.

According to one embodiment, the waveguide rests on its back face on a support substrate, advantageously the support substrate comprises silicon.

The invention also relates to an optical detector using at least one optical device according to this invention.

BRIEF DESCRIPTION OF THE DRAWINGS

Other characteristics and advantages will become clear in the following description of an optical device according to the invention, given as non-limitative examples, with reference to the appended drawings in which.

DETAILED PRESENTATION OF PARTICULAR EMBODIMENTS

The invention disclosed in detail below relates to an optical device that comprises a waveguide on which an actuator is formed. Said actuator, once an electric field is applied to it, will impose a mechanical stress at the core to modify the refraction index.

In particular, the actuator is offset laterally with a so-called lateral offset within a predefined range. In particular, the lateral offset unexpectedly amplifies the magnitude of the stress imposed on the waveguide.

Figure 1:
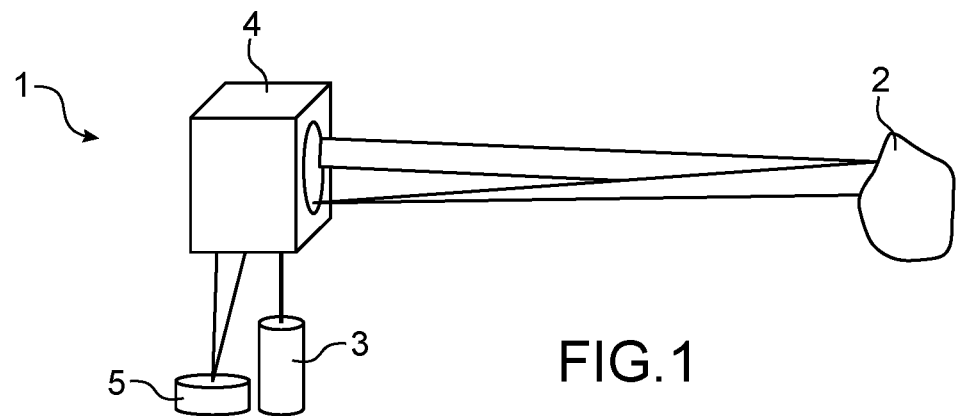
FIG. 1 is a diagram representing the operation of a LIDAR for detection of an object.
Figure 2:
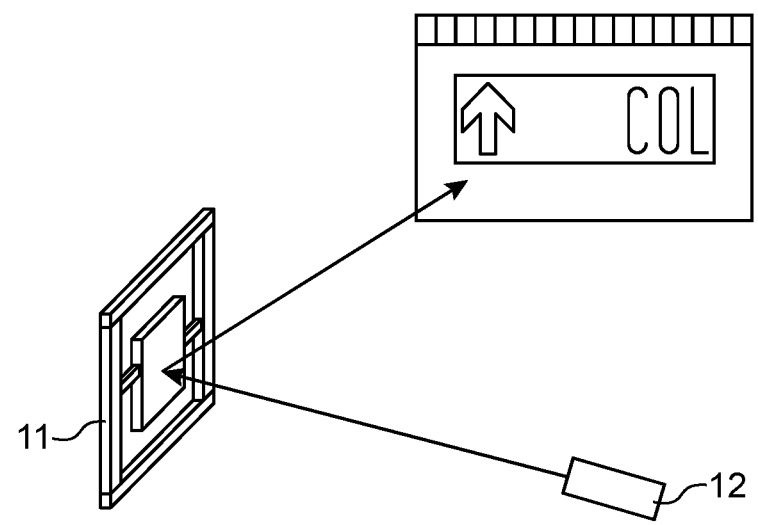
FIG. 2 is a diagram representative of the use of a mirror to deflect light radiation according to techniques known to an expert in the subject.
Figure 3:
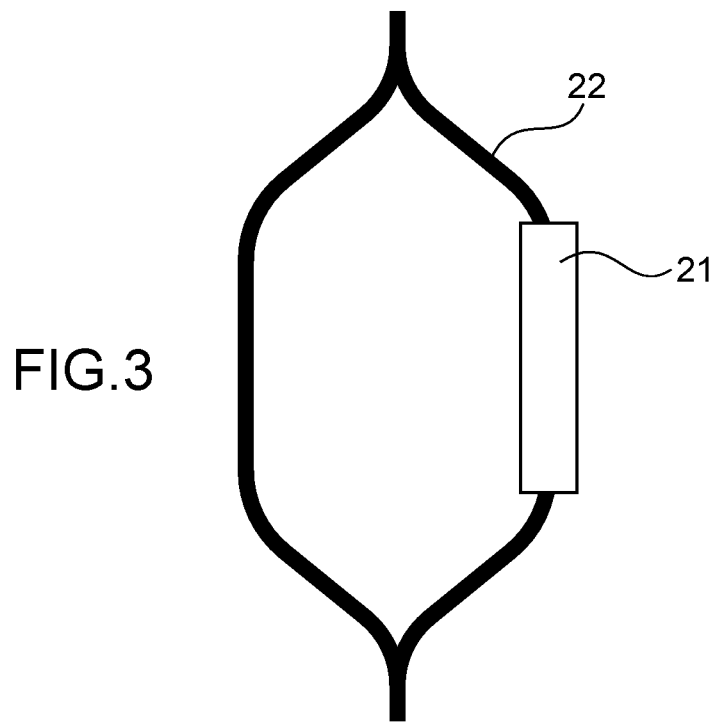
FIG. 3 is a diagram representative of the use of a piezoelectric actuator to generate a stress in a waveguide so as to modify the refraction index according to techniques known to an expert in the subject.
Figure 4:
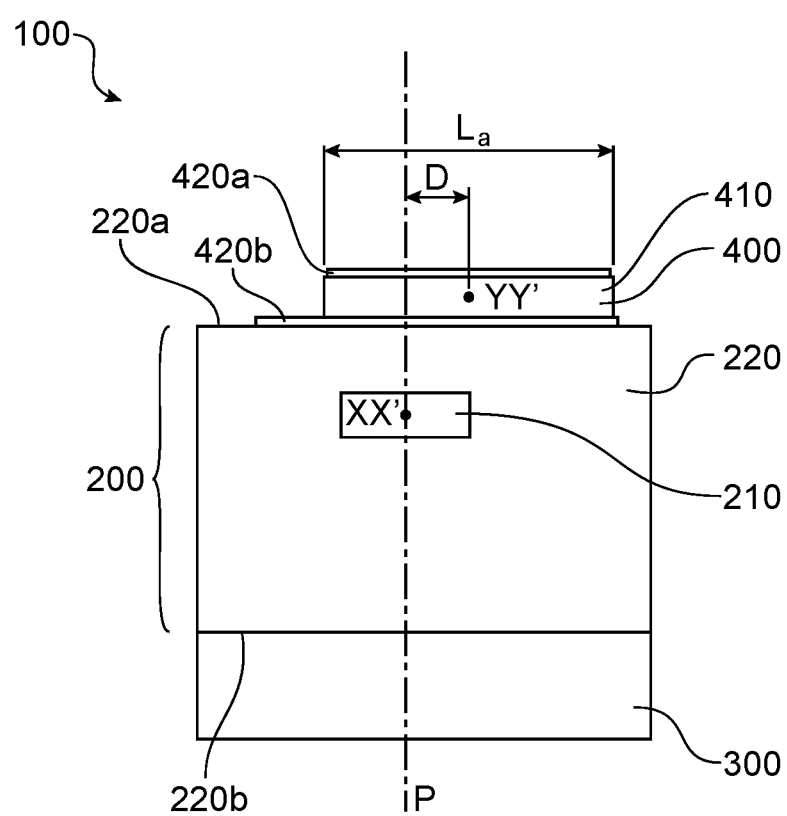
FIG. 4 is a sectional view of the optical device according to the invention, in a section plane perpendicular to the front and back faces of the cladding layer.

FIG. 4 shows an example of the optical device 100 according to this invention.

In particular, the optical device 100 comprises a waveguide 200.

The waveguide 200 comprises in particular a core 210 encapsulated in a cladding layer 220.

"Encapsulated" means contained within the volume of the cladding layer 220.

For the purposes of this invention, it is understood that the refraction index $n_c$ of the core 210 is higher than the refraction index $n_g$ of the cladding layer 220, and corresponds to the medium in which light radiation guided by the waveguide 200 is confined.

The cladding layer 220 comprises two essentially parallel faces called the front face 220a and the back face 220b respectively.

Furthermore, the core 210 extends along a first axis of symmetry XX' (the first axis of symmetry XX' is perpendicular to the plane of FIG. 4).

"Extends along an axis of symmetry" means an element that has a generally elongated shape.

The waveguide 200 can be between about 1 μm and 3 μm thick.

It is understood that the thickness of the waveguide 200 corresponds to the distance between the principal faces 220a and 220b. In particular, the thickness of the waveguide 200 is associated with the thickness of the cladding layer 220.

The waveguide 200 may be supported on a support substrate 300, particularly a support substrate made of a semiconducting material, and particularly silicon.

The cladding layer 220 may include silicon dioxide.

The core 210 may include silicon nitride.

The width of the core 210 may be between 100 nm and 2 μm.

"Wave guide width" means a dimension perpendicular to the first axis of symmetry and in a plane perpendicular to one of the two principal faces.

The optical device 100 also comprises an actuator 400 located on one or the other of the front face 220a and the back face 220b, that at least partly overlaps the core 210.

"At least partially overlaps the core" means an actuator at least partly facing the core.

The actuator 400 extends along a second axis of symmetry YY' (the second axis of symmetry is perpendicular to the plane in FIG. 4) essentially parallel to the first axis of symmetry XX'.

The width of the actuator 400 is $L_a$.

It is understood that, without it being necessary to state it, the width $L_a$ of the actuator 400 is measured along a direction perpendicular to the second axis of symmetry and in a plane parallel to the face on which it is supported.

The actuator 400, once an electric voltage is applied to it, will impose a mechanical stress on the core to modify its refraction index.

According to this invention, the second axis of symmetry YY' is offset laterally by an offset called the lateral offset D from a plane of symmetry P of the waveguide 200 including the first axis of symmetry and perpendicular to the principal faces of the cladding layer 220.

More particularly, the lateral offset D is between 15% and 50% of the width $L_a$.

The inventors have observed that for this range of relative offsets, the mechanical stress applied to the waveguide, and particular the core 210, is much higher than the stress observed in the case of an actuator 400 for which the offset is zero.

Figure 5:
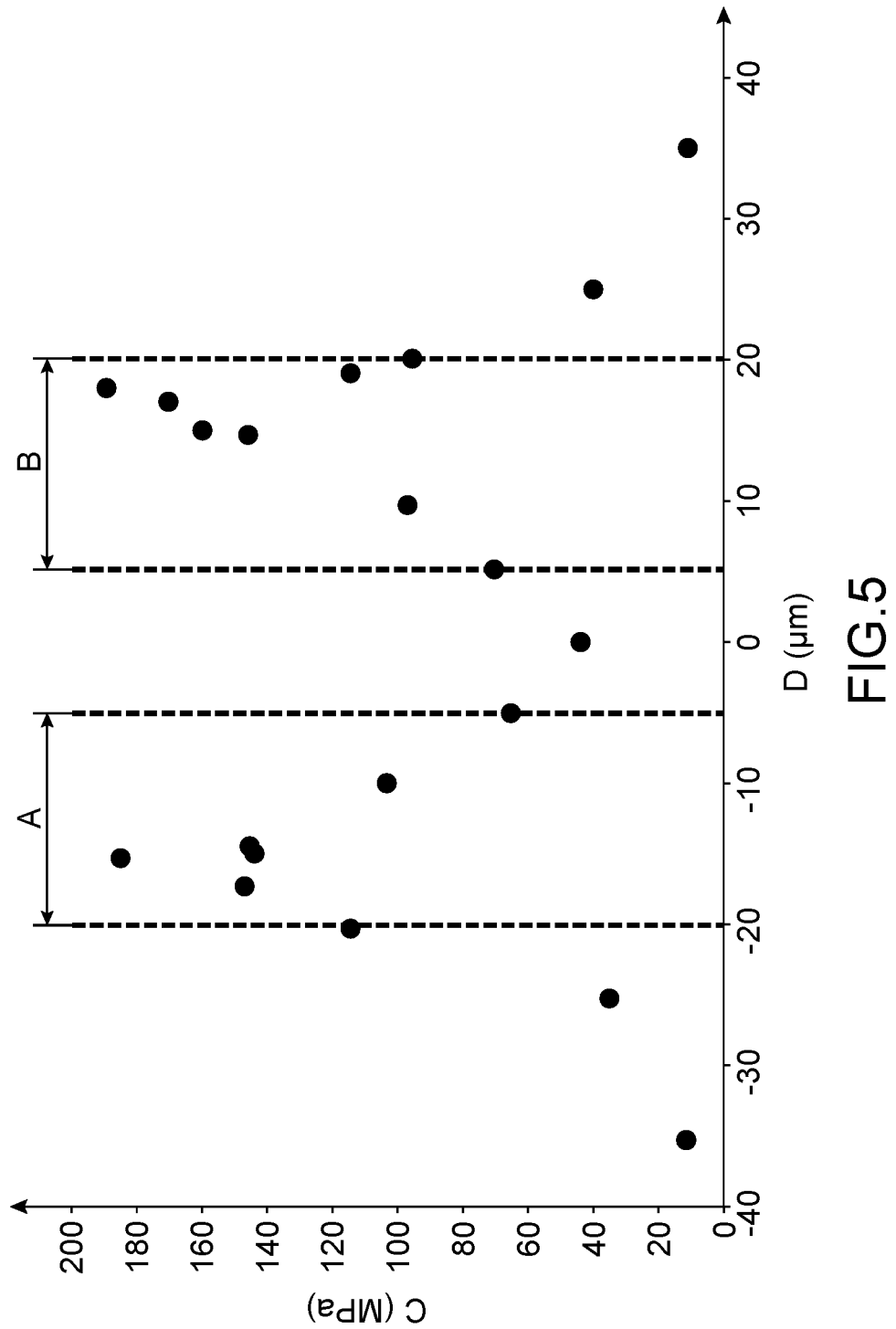
FIG. 5 is a graphic view of the mechanical stress (vertical axis, Von Mises stress in MPa,) as a function of the lateral offset D (horizontal axis, in μm) obtained by finite element simulation.

For example, FIG. 5 is a graphic representation simulated by a finite element method, of the variation of mechanical stress imposed on a core 210. For this simulation, the silicon nitride core 210 is buried at a depth of 1 μm below the underside 220a of the cladding layer, and its thickness and width are of the order of 300 nm and 600 nm respectively.

The actuator 400 is made of PZT and its width is of the order of 30 μm.

On FIG. 5, it is seen that the mechanical stress for offsets of between 5 μm and 20 μm on each side of the plane of symmetry P (zones A and B marked on FIG. 5) is much higher than the stress obtained for a zero lateral offset D. This unexpected and especially counter-intuitive effect can then induce a variation of the refraction index of the core 210 for relatively low electrical voltages at the actuator.

Particularly advantageously, the ratio between the width $L_a$ and the core width can be between 8 and 100, advantageously between 15 and 100, and even more advantageously between 30 and 100.

Also advantageously, the width $L_a$ can be between 5 μm and 60 μm, advantageously between 10 μm and 60 μm, and even more advantageously between 20 μm and 60 μm.

Finally, the actuator 400 can include a first material 410 placed between two electrodes 420a and 420b that will apply the electric field to said actuator 400. In particular, the first material 410 can be made of a piezoelectric material or a ferroelectric material or an electrostrictive material.

In particular, the first material may comprise at least one element chosen from among: Lead zirconate titanate, aluminium nitride, zinc oxide, polyvinylidene fluoride, lithium niobiate (LNO for $LiNbO_3$), $BaTiO_3$, $PbTiO_3$.

The invention also relates to an optical detector using at least one optical device 100.

The device 100 can be fabricated by micro-fabrication techniques known to an expert in the subject.

Figure 6A:
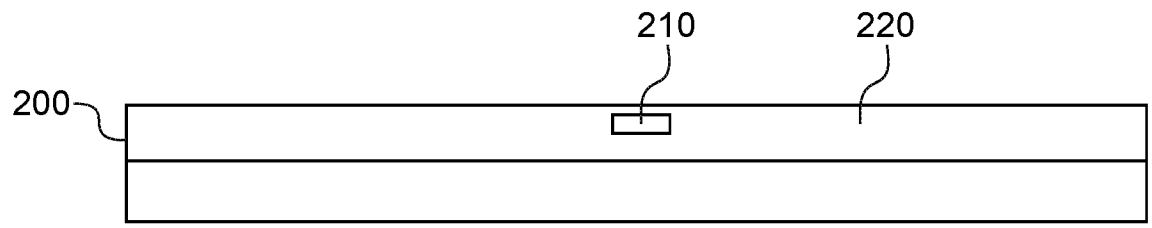
FIGS. 6a to 6c are diagrammatic views of different steps in a method adapted to formation of the optical device according to this invention.
Figure 6B:
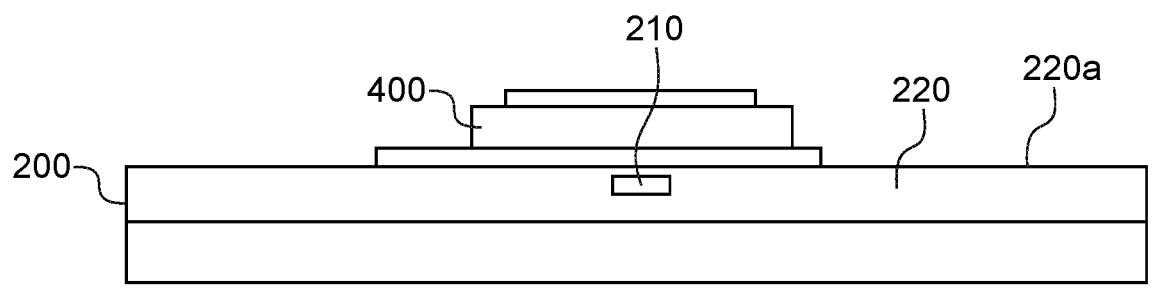
Figure 6C:
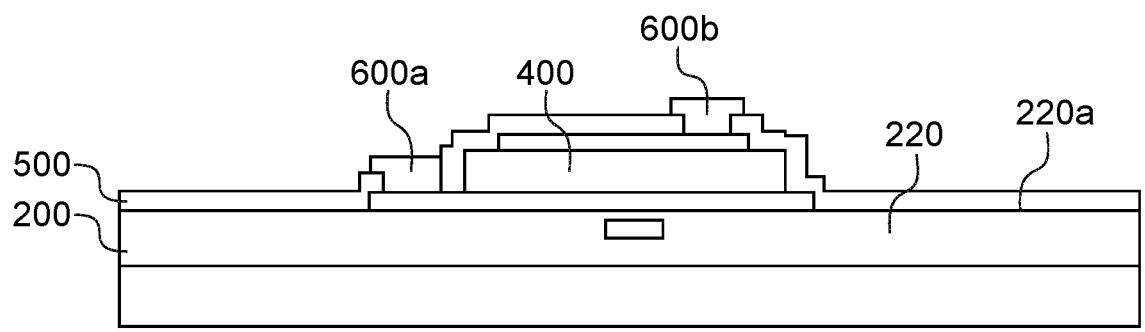

In this respect, FIGS. 6a to 6c are diagrammatic views of different steps in a method adapted to formation of the optical device 100 according to this invention.

The method includes a step a) for formation of the waveguide 200 (FIG. 6a). In particular, this step a) can include elementary steps for the formation of silicon oxide, silicon nitride layers, and mechanical-chemical polishing steps, elementary etching steps or elementary steps to define patterns by photo lithography.

In particular, elementary steps related to step a) may include the following steps in sequence:
Formation of a 2 μm thick $Si_2$ layer;
Formation of a 300 nm thick $Si_3N_4$ layer;
Definition of the core of the waveguide by the combination of a photo lithography step and an etching step;
Formation of a 1 μm thick $Si_2$ layer;
Polish the $Si_2$ layer to plan arise it The process also includes a step b) (FIG. 6b) for formation of the actuator 400 on the front face 220a. This step b) can in particular include elementary steps to form metallic layers (for example Pt and/or Ru), an elementary step to form a layer of the first material (particularly PZT), and elementary steps to define etching or elementary steps to define patterns by photo lithography.

In particular, elementary steps related to step b) may include the following steps in sequence:
Formation of a 20 nm thick titanium dioxide layer followed by the formation of a 100 nm thick platinum layer on the waveguide formed in step a);
Formation of a 2 μm thick PZT layer;
Formation of a stack of ruthenium and platinum, or a single 100 nm thick layer of platinum;
Define the actuator by the combination of photo lithography and etching steps, said definition in particular delimiting electrodes that will impose the electrical field on the actuator.

Finally, the process can include a step c) for passivated and making contacts with the optical device 100.

In particular, step c) may include an elementary step for the formation of a passivated layer 500, for example a 300 nm thick silicon oxide layer, covering the optical device 100.

The elementary step of making contact will form electrical contacts 600a and 600b at the electrodes formed in step b).

The elementary step of making contact may then include the following steps in sequence:
Open the contact at the passivated layer to access the electrodes;
Formation of a 500 nm stack of titanium and gold, and delimitation of contacts by a combination of a photo lithography step and an etching step.

The optical device according to this invention that can be obtained by the fabrication method described above, can thus solve the technical problem described in the state of the art.

In particular, the relative layout of the actuator with respect to the core of the waveguide makes it possible to apply higher stresses in said waveguide and consequently larger variations of the refraction index.

REFERENCES

[1] Acolyte et al., "*Two-Dimensional Dispersive Off-Chip Beam Scanner Fabricated on Silicon-On-Insulator*", IEEE Photons Technology Letters 23, no. 17 (September 2011): 1270-1272;
[2] Behrooz Abiri, et al., "*Electronic Two-Dimensional Beam Steering for Integrated Optical Phased Arrays*" M2K.7. OSA, 2014;
[3] U.S. Pat. No. 5,383,048;
[4] Hussein, "*Stress-optic modulator in TriPlex platform using a piezoelectric lead zirconate titanate (PZT) thin film*", Optics express 14018, Jan. 6, 2015.

The invention claimed is:

1. An optical device comprising:
a waveguide comprising a core extending along a first axis of symmetry XX', and encapsulated in a cladding layer provided with essentially parallel front and back faces,
an actuator with width $L_a$, located on the front face and completely overlapping the core and extending along a second axis of symmetry YY' essentially parallel to the first axis of symmetry XX', said actuator is designed so that when an electric field is applied to said actuator, said actuator imposes a mechanical stress at the core to modify a refraction index of the core,
wherein the second axis of symmetry YY' is offset laterally by a lateral offset D from the first axis of symmetry and perpendicular to the essentially parallel front and back faces of the cladding layer, and
wherein the lateral offset D is between 15% and 50% of the width $L_a$.

2. The device according to claim 1, wherein the ratio between the width $L_a$ and the width of the core is between 8 and 100.

3. The device according to claim 1, wherein the width $L_a$ is between 5 μm and 60 μm.

4. The device according to claim 1, wherein the actuator comprises a first material placed between two electrodes that will apply the electric field to said actuator, the first material including a piezoelectric material or a ferroelectric material or an electrostrictive material.

5. The device according to claim 4, wherein the first material includes at least some elements chosen from among: Lead zirconate titanate, aluminium nitride, zinc oxide, polyvinylidene fluoride, lithium niobate (LNO for LiNbO3), BaTiO3, PbTiO3.

6. The device according to claim 4, wherein the first material comprises Lead zirconate titanate.

7. The device according to claim 4, wherein the first material comprises aluminium nitride.

8. The device according to claim 4, wherein the first material comprises zinc oxide.

9. The device according to claim 4, wherein the first material comprises polyvinylidene fluoride.

10. The device according to claim 4, wherein the first material comprises lithium niobate (LiNbO3).

11. The device according to claim 4, wherein the first material comprises BaTiO3.

12. The device according to claim 4, wherein the first material comprises PbTiO3.

13. The device according to claim 1, wherein the thickness of the waveguide is between is 1 μm and 3 μm.

14. The device according to claim 1, wherein the cladding layer comprises silicon dioxide.

15. The device according to claim 1, wherein the core comprises silicon nitride.

16. The device according to claim 1, wherein the waveguide rests on its back face on a support substrate, advantageously the support substrate comprises silicon.

17. An optical detector including an optical device according to claim 1.

18. The device according to claim 1, wherein the ratio between the width $L_a$ and the width of the core is between 15 and 100.

19. The device according to claim 1, wherein the ratio between the width $L_a$ and the width of the core is between 30 and 100.

20. The device according to claim 1, wherein the width $L_a$ is between 10 μm and 60 μm.

21. The device according to claim 1, wherein the width $L_a$ is between 20 μm and 60 μm.

* * * * *